United States Patent [19]

Seufer

[11] 4,000,790
[45] Jan. 4, 1977

[54] LUBRICANT PROPORTIONING PUMP
[75] Inventor: Theo Seufer, Bad Wimpfen, Germany
[73] Assignee: Audi Nsu Auto Union Aktiengesellschaft, Neckarsulm, Germany
[22] Filed: Dec. 11, 1974
[21] Appl. No.: 531,545
[30] Foreign Application Priority Data
  Dec. 14, 1973  Germany .......................... 2362194
[52] U.S. Cl. .................................. 184/27 R; 184/33
[51] Int. Cl.² ..................... F16N 7/40; F16N 13/04
[58] Field of Search .................. 184/32, 33, 34, 35, 184/27 R, 27 E, 27 A, 27 B, 27 C, 27 D, 6.4, 6.22, 7 CR, 7 D, 7 E, 7 F, 15 R, 68, 104 R, 104 A, 6.1

[56] References Cited
UNITED STATES PATENTS

| 1,279,480 | 9/1918 | Strand | 184/33 |
| 1,857,992 | 5/1932 | Wilkes | 184/68 |
| 2,056,434 | 10/1936 | Müller | 184/33 |
| 3,717,221 | 2/1973 | Densow | 184/15 R X |

FOREIGN PATENTS OR APPLICATIONS

| 182,585 | 7/1955 | Austria | 184/33 |
| 873,253 | 3/1942 | France | 184/33 |
| 1,283,042 | 11/1968 | Germany | 184/27 R |
| 1,287,387 | 1/1969 | Germany | 184/27 R |
| 245,409 | 1/1926 | United Kingdom | 184/33 |

Primary Examiner—Richard C. Pinkham
Assistant Examiner—Arnold W. Kramer
Attorney, Agent, or Firm—Kane, Dalsimer, Kane, Sullivan and Kurucz

[57] ABSTRACT

A lubricant proportioning pump having a delivery piston controlling the pumping operation, rotatable about its longitudinal axis by way of a step-down transmission and movable to and fro in lengthwise direction by means of a cam track held against a fixed guide by spring action, while an adjustable stop cooperates with the piston and limits its stroke, the adjustable stop having an expansion element arranged therein for varying the stroke of the piston as a function of temperature.

6 Claims, 3 Drawing Figures

# LUBRICANT PROPORTIONING PUMP

BACKGROUND OF THE INVENTION

Lubricant proportioning pumps are used, for example, for controlled lubrication of an internal combustion engine power plant. Such known lubricant proportioning pumps employed for this purpose are constantly supplied with lubricant during operation at a rate representing the rate of consumption plus an excess. Out of this available volume, inside the pump, lubricant is withdrawn and delivered according to the speed of the engine, the rate of delivery of lubricant being influenced as well by the load setting of the engine controls. In accordance with the requirements of the engine, the added effect of the load setting has the result that at a high load, the delivery piston executes its full stroke, thus increasing the flow of lubricant, and at low load, for example when idling, with correspondingly shorter stroke of the delivery piston, a lesser flow of lubricant is delivered. But this means that after starting and while warming up, when the engine load is low, and especially at low temperatures, the lesser flow of lubricant supplied to the engine may possibly fail to adequately lubricate, with premature wear of the power plant as the likely consequence.

SUMMARY OF THE INVENTION

The object of the invention is to provide a lubricant proportioning pump that will also deliver an increased flow of lubricant at low temperature.

This object is accomplished, according to the invention, in that an expansion element is arranged in the delivery piston or in the adjustable stop to vary the stroke of the piston as a function of temperature. By virtue of the arrangement of an expansion element, the adjustable stop cooperating with the delivery piston is able to limit the stroke to the extent to which the expansion element has expanded under the influence of increased temperature, while the lubricant constantly supplied to the pump during operation serves as the temperature medium acting on the expansion element. The result of this improvement is that the delivery piston of the proportioning pump will execute a longer stroke at low lubricant temperatures and consequently deliver a larger flow of lubricant, whereas with rising temperature the stroke will be limited and the flow of lubricant then delivered will be determined by the load setting of the adjustable stop alone. This additional control of lubricant flow as a function of temperature will to a large extent assure the supply of lubricant to the power plant in cold operation specifically.

For the sake of compactness, and to obtain expansion in axial or lengthwise direction exclusively, the expansion element may be arranged axially movable in a lengthwise bore of the delivery piston, being supported on the piston at the end away from the adjustable stop. Alternatively, however, the expansion element may be arranged axially movable in a lengthwise bore of the adjustable stop, and be supported on the adjustable stop at the end away from the piston.

Since the expansion element can expand freely in its longitudinal bore, it is expedient, in order to fix its extreme position, to provide an abutment in the lengthwise bore of the piston or stop, as the case may be, to limit the outward motion of the expansion element.

The idea of the invention further provides that at the end of the expansion element supported by the delivery piston or the adjustable stop, as the case may be, a compression spring is interposed, whose reaction, in every operating condition, is greater than that of the compression spring holding the delivery piston against the fixed guide. Thus the expansion element, when it has reached the limiting abutment in its outward motion, can spend its further expansion on the spring inside the bore.

The expansion element may preferably consist of a wax capsule. Alternatively, however, an expansion element of polytrifluorochloroethylene might be employed.

Embodiments of the invention will now be described in more detail with reference to the drawings by way of example.

DESCRIPTION OF THE PREFERRED EMBODIMENTS

Figure 1:
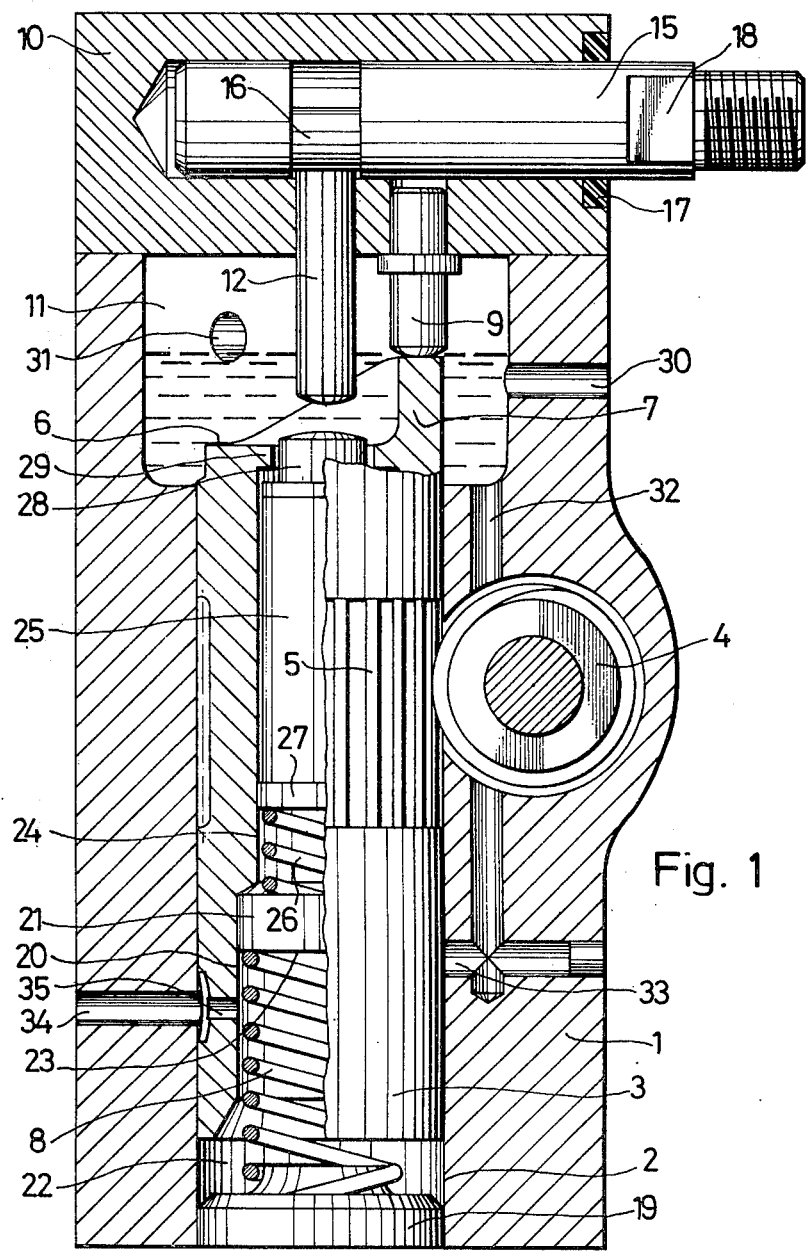
FIG. 1 shows a longitudinal section of a lubricant proportioning pump with an expansion element arranged in the delivery piston in accordance with the invention.

The pump shown in FIG. 1 consists for example of a housing 1 having a cylindrical bore 2 in which a delivery piston 3 is mounted rotatable about its longitudinal axis by way of a stepdown transmission consisting of a worm with shaft 4 and teeth 5 on the periphery of the piston 3. On its top face 6, the piston 3 has a humped cam track 7 held against a fixed guide 9 by a compression spring 8. As the piston 3 rotates, the track 7 runs along the fixed guide 9 and imparts a lengthwise motion to piston 3, reciprocating once per revolution. The fixed guide 9 is arranged in a cover 10 closing off a chamber 11 in the housing 1 from the outside. In addition, the cover 10 is provided with an adjustable stop 12 arranged coaxially with the piston 3. Perpendicular to the adjustable stop 12, a shaft 15 is arranged in the cover 10, having a cam 16 cooperating with the adjustable stop 12. The protruding end of shaft 15, sealed by packing 17, is connected to the engine controls.

The cylindrical bore 2 is closed tight at the other end from chamber 11 by a plug 19. Between this plug 19 and a plate 21 pressed firm and tight into the bore 20 of piston 3 is held the compression spring 8 holding the piston 3 against the fixed guide 9. Thus the plate 21 axially bounds the working chamber 22 proper of the piston 3, the active surface of which is the surface 23 of plate 21. Between the plate 21 and the face 6 of the piston 3, an expansion element 25 is set in another longitudinal bore 24. By its end towards the plate 21, the expansion element 25 is supported on the plate 21 by way of an interposed plate 27 and another compression spring 26, while the other end is provided with a head 28. The outward axial mobility of the expansion element 25 jointly with the head 28 is limited by a stop 29 in piston 3.

The housing 1 of the pump is further provided with a lubricant inlet 30 opening into the chamber 11. An excess of lubricant passing into chamber 11 can return by way of an overflow 31, while in the bottom of chamber 11 a lubricant passage 32 connects, opening laterally into the bore 2 by way of an aperture 33. More or less opposed to this aperture 33 is the lubricant outlet 34, through which the lubricant can escape in controlled manner. To withdraw and release lubricant into and from the working chamber 22, the wall of the delivery piston 3 is provided with a radial control aperture 35.

The lubricant proportioning pump described operates as follows.

Figure 2:
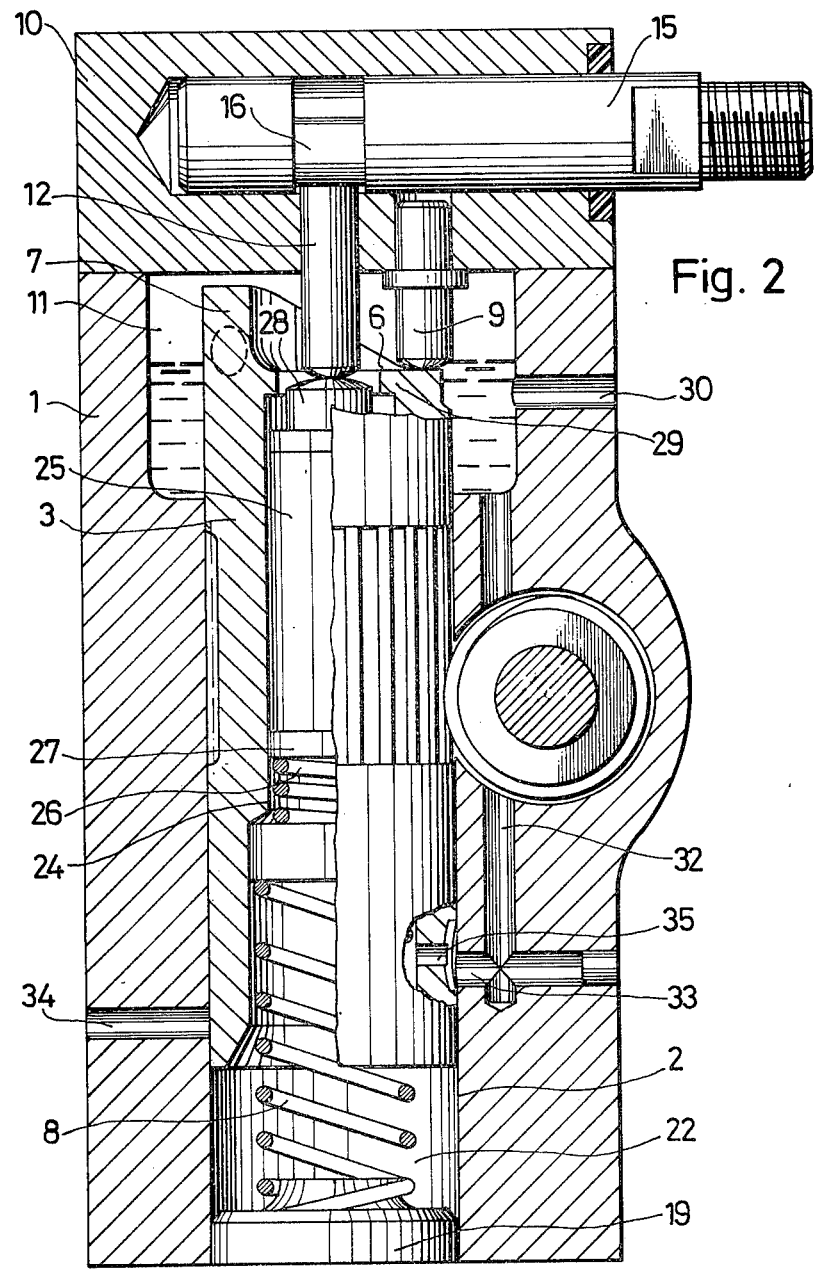
FIG. 2 shows the pump of FIG. 1 in longitudinal section with the piston in a different position.

In operation, the worm 4 is driven by the motor, not shown, and rotates the piston 3 about its longitudinal axis by way of its gear teeth 5. At the same time, lubricant is supplied by way of inlet 30 by a delivery means not shown from a tank associated with the engine into chamber 11. The cam track 7 of piston 3 slips down from its highest elevation — as shown in FIG. 1 — so that the piston 3, held against the fixed guide 9 by the force of spring 8, slides upward. This enlarges the working chamber 22, and, while aperture 33 meets control aperture 35, draws lubricant in out of chamber 11 by way of passage 32. During this phase — as shown in FIG. 2 — the face 6 of piston 3 slides along the fixed guide 9. The pressure stroke of piston 3 is initiated when the cam 7 pushes the piston 3 downward, compressing the spring 8, thereby reducing the size of the working chamber 22 and expelling the lubricant previously drawn into chamber 22 into the outlet 34 by way of orifice 35, as shown in FIG. 1. During this operation, the piston 3 has made one revolution on its longitudinal axis.

As shown in FIG. 2, the expansion element 2 has contracted under the influence of low temperatures. In this position, the adjustable stop 12, actuated by way of shaft 15 according to idling or partial load level, exerts less effect on piston 3, so that the piston 3 can execute a longer stroke. In this phase, therefore, corresponding to a cold start, the lubricant pump will deliver the desired higher proportion to lubricate the power plant. Since the pump is now being supplied with lubricant getting constantly warmer, the expansion element 25 can expand outward in its longitudinal bore 24 until its head 28 is against the stop 29 in piston 3. According to the expansion of the element 25, the piston 3 will be stopped in its upward stroke by the adjustable stop 12 by way of the head 28, shortening the stroke so that a smaller flow of lubricant, depending on the degree of expansion, will be drawn in and expelled by the working chamber 22. Once the machine has reached its operating temperature, the stroke will be limited or increased only in known manner by the position, depending on the load setting, of stop 12. The head 28 in piston 3, in any position occupied by the expansion element, constitutes an unyielding stroke limitation against the adjustable stop 12, since the compression spring 26 is built stronger than the compression spring 8 holding the piston 3 against the fixed guide 9. The only function of spring 26 is to allow the expansion element 25 to expand against spring 26 inside its longitudinal bore 24 in response to a further elevation of temperature.

Figure 3:
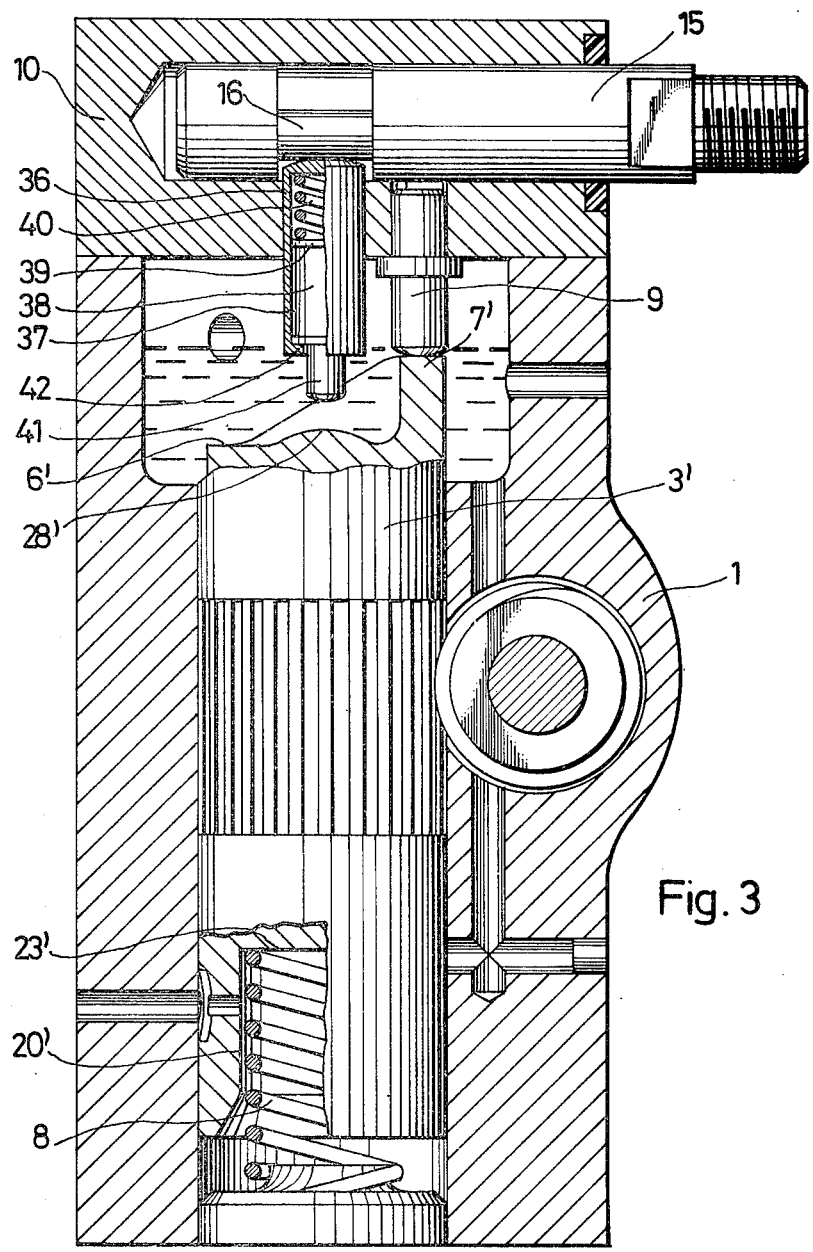
FIG. 3 shows a longitudinal section of a pump similar to that of FIG. 1 with the expansion element arranged in the adjustable stop.

In the lubricant proportioning pump shown in FIG. 3, the same reference numerals as in FIGS. 1 and 2 have been used for like or similar parts. In departure from the embodiment of FIGS. 1 and 2, and adjustable stop 36 arranged in the cover 10 has an expansion element 38 set in its lengthwise bore 37, bearing at one end on the floor of said bore by way of a plate 39 and compression spring 40, and in contact at the other end with a head 41 whose axial mobility in the adjustable stop 36 is limited by a shoulder 42. The piston 3' is pressed with its humped cam track 7' against a fixed guide 9 by a compression spring 8 intruding into a bore 20' and bearing on a surface 23', while at the top face 6', a fixed head 28' is arranged on the piston 3'.

In this arrangement also, the stroke of the piston 3' is influenced according to the temperature of the incoming lubricant, the expansion element 38 shrinking in response to low temperature so that the piston 3' can execute a longer stroke. As the lubricant gets warmer, the expansion element 38 can expand inside its bore 37 outward until the head 41 reaches the shoulder 42 in the adjustable stop 36, the head 28' of piston 3' in its upward stroke being stopped by the head 41 of the adjustable stop 36 in its position as shown in FIG. 3, so that the stroke and hence the flow of lubricant delivered are diminished. The spring 40 is built stronger than the spring 8 holding the piston 3' against the fixed guide 9, so that in every position assumed by the expansion element 38, the head 41 in the adjustable stop 36 provides an unyielding limitation of stroke against the head 28' of piston 3'.

The spring 40 permits expansion of the element 38 inside the bore 37 of the adjustable stop 36 in response to further temperature rise. Independently of the temperature controlled limitation of the stroke of the delivery piston 3', in this arrangement also the stroke can be limited or increased by the load setting by way of shaft 15 and cam 16.

Thus, the several aforenoted objects and advantages are most effectively attained. Although several somewhat preferred embodiments have been disclosed and described in detail herein, it should be understood that this invention is in no sense limited thereby and its scope is to be determined by that of the appended claims.

What is claimed is:

1. A lubricant proportioning pump comprising a housing, a bore in said housing, a delivery piston mounted in said bore for reciprocating and rotary motion, said bore having a closed end, a working chamber between said closed end and an endface of the piston, said working chamber having an inlet port controlled by the piston and an outlet port, a step-down transmission for rotating the piston about its longitudinal axis, cam means for reciprocating the piston during its rotary motion, said cam means comprising a cam track member cooperating with a guide member, one of said members being on the piston and the other on the housing, spring means for urging the piston longitudinally towards the member on the housing, an adjustable stop in the housing for limiting the stroke of the piston, and a temperature-responsive expansion element arranged in the piston for cooperation with said stop at the end of the piston stroke, said expansion element being expandible towards said stop on increasing temperature of the lubricant for reducing the piston stroke.

2. A lubricant proportioning pump as claimed in claim 1, wherein said expansion element extends into a chamber arranged in the path of the lubricant upstream of said inlet port.

3. A lubricant proportioning pump as claimed in claim 1, wherein said expansion element is arranged axially movable within a longitudinal bore of the piston, said longitudinal bore having a plate for the end of the expansion element away from the adjustable stop, and a spring in said longitudinal bore for resiliently urging said plate against said end, said spring being harder than the spring means which urge the piston towards said member on the housing.

4. A lubricant proportioning pump comprising a housing, a bore in said housing, a delivery piston mounted in said bore for reciprocating and rotary motion, said bore having a closed end, a working chamber between said closed end and an endface of the piston, said working chamber having an inlet port controlled by the piston and an outlet port, a step-down transmission for rotating the piston about its longitudinal axis, cam means for reciprocating the piston during its rotary motion, said cam means comprising a cam track member cooperating with a guide member, one of said members being on the piston and the other on the housing, spring means for urging the piston longitudinally towards the member on the housing, an adjustable stop in the housing for limiting the stroke of the piston, and a temperature-responsive expansion element arranged in said stop for cooperation with the piston at the end of the piston stroke, said expansion element being expandible towards the piston on increasing temperature of the lubricant for reducing the piston stroke.

5. A lubricant proportioning pump as claimed in claim 4, wherein the expansion element extends into a chamber arranged in the path of the lubricant upstream of said inlet port.

6. A lubricant proportioning pump as claimed in claim 4, wherein said expansion element is axially movable within a longitudinal bore in the adjustable stop, said longitudinal bore having a plate for the end of the expansion element away from the piston, and a spring in said longitudinal bore for resiliently urging said plate against said end.

* * * * *